(12) United States Patent
Oishi et al.

(10) Patent No.: US 8,734,280 B2
(45) Date of Patent: May 27, 2014

(54) INNER LINK PLATE FOR BICYCLE CHAIN

(75) Inventors: Toshinari Oishi, Osaka (JP); Tsuyoshi Fukumori, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 378 days.

(21) Appl. No.: 13/160,576

(22) Filed: Jun. 15, 2011

(65) Prior Publication Data
US 2012/0322599 A1  Dec. 20, 2012

(51) Int. Cl.
*F16G 13/06* (2006.01)
*F16G 13/02* (2006.01)

(52) U.S. Cl.
USPC .......................................................... 474/230

(58) Field of Classification Search
USPC .................. 474/206, 212, 217, 230
See application file for complete search history.

(56) References Cited

U.S. PATENT DOCUMENTS

| | | | |
|---|---|---|---|
| 4,265,134 A * | 5/1981 | Dupoyet | 474/231 |
| 4,596,539 A | 6/1986 | Yamasaki | |
| 4,642,078 A * | 2/1987 | Dupoyet | 474/206 |
| 5,066,265 A * | 11/1991 | Wu | 474/206 |
| 5,073,153 A * | 12/1991 | Wu | 474/206 |
| 5,098,349 A * | 3/1992 | Wu | 474/206 |
| 5,226,857 A | 7/1993 | Ono et al. | |
| 5,741,196 A | 4/1998 | Campagnolo | |
| 5,799,479 A * | 9/1998 | Tanaka | 59/4 |
| 7,325,391 B1 | 2/2008 | Oishi et al. | |
| 2005/0020394 A1 | 1/2005 | Valle | |

FOREIGN PATENT DOCUMENTS

DE  20 2010 008 814 U1  1/2011

OTHER PUBLICATIONS

European Search Report of corresponding EP Application No. 12 15 5045.3 date Mar. 18, 2014.

* cited by examiner

*Primary Examiner* — William E Dondero
*Assistant Examiner* — Mark K Buse
(74) *Attorney, Agent, or Firm* — Global IP Counselors (57) ABSTRACT

An inner link plate is provided for a chain. The inner link plate has a longitudinal centerline, an inside surface arranged to face another inner link plate when the chain is assembled, an outside surface opposite to the inside surface, and an outer peripheral edge disposed between the inside and outside surfaces. The bicycle inner link plate basically has a first end portion, a second end portion and a connecting portion. The first and second end portions are each provided with a connecting opening. The connecting portion includes a recess disposed on the inside surface of the connecting portion. The recess has a maximum longitudinal width on the outer peripheral edge, and a minimum longitudinal width in a region adjacent the longitudinal centerline. The recess at least extends from the outer peripheral edge to the longitudinal centerline.

17 Claims, 8 Drawing Sheets

# INNER LINK PLATE FOR BICYCLE CHAIN

BACKGROUND

1. Field of the Invention

This invention generally relates to a configuration of an inner link plate for a bicycle chain. More specifically, the present invention relates to an inner link plate for a bicycle chain that is used in a bicycle that shifts between sprockets to change gears.

2. Background Information

Most bicycles have a drive train that uses a chain to transmit the pedaling action from the rider to the rear wheel. Bicycle chains have a plurality of inner links and a plurality of outer links that are interconnected in an alternating manner by a plurality of pins. Typically, each of the inner links includes a pair of parallel inner plates connected by a pair of parallel hollow cylinders or pins surrounded by cylindrical rollers. Each of the outer links includes a pair of parallel outer plates connected by the pins of the adjacent inner links. In order to form a single continuous chain, two of the inner links are connected together by a releasable connecting link, which is often called a master chain link.

In recent years, bicycles have been produced with an increasing number of rear gears or sprockets. As the number of rear sprockets increased, this situation has resulted in the chain becoming narrower. In other words, in bicycle chains, the width of the bicycle chain is narrowed as the number of sprockets of the rear cassette as increased in recent years. Examples of bicycle chains are disclosed in U.S. Pat. No. 4,265,134 to Dupoyet, U.S. Pat. No. 4,596,539 to Yamasaki, U.S. Pat. No. 5,226,857 to Ono et al., U.S. Pat. No. 5,741,196 to Campagnolo and U.S. Patent Publication No. 2005/0020394A1 to Valle.

SUMMARY

It has been discovered that using a narrower chain may present problems in shifting from one sprocket to the next sprocket. For example, one potential problem of using narrow chain is that the widths of the spaces between the inside surfaces of the inner link plates where the teeth of the sprockets enter the inner link becomes too narrow. As a result, the inside surfaces of the inner link plates may undesirably catch on the teeth of the sprockets during shifting from one sprocket to the next sprocket One aspect of the inner link plate of this disclosure is to create widths of the spaces between inside surfaces of the inner link plates as widely as possible even if the width of the bicycle chain is narrowed.

In view of the state of the known technology, an inner link plate for a bicycle chain is proposed. The inner link plate has a longitudinal centerline, an inside surface arranged to face another inner link plate when the bicycle chain is assembled, an outside surface opposite to the inside surface, and an outer peripheral edge disposed between the inside and outside surfaces. The inner link plate basically comprises a first end portion, a second end portion and a connecting portion. The first end portion is provided with a first connecting opening. The second end portion is provided with a second connecting opening. The connecting portion interconnects the first and second end portions. The connecting portion includes a recess disposed on the inside surface of the connecting portion. The recess has a maximum longitudinal width on the outer peripheral edge and a minimum longitudinal width in a region adjacent the longitudinal centerline of the inner link plate. The recess at least extends from the outer peripheral edge to the longitudinal centerline of the inner link plate.

As a result of the inner link plate having the recess disposed on the inside surface of the connecting portion, teeth of a sprocket can smoothly enter the space between two of the inner link plates even during shifting between two sprockets even if the width of the bicycle chain is narrowed.

These and other objects, features, aspects and advantages of the inner link plate will become apparent to those skilled in the art from the following detailed description, which, taken in conjunction with the annexed drawings, discloses illustrative embodiments of the inner link plate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
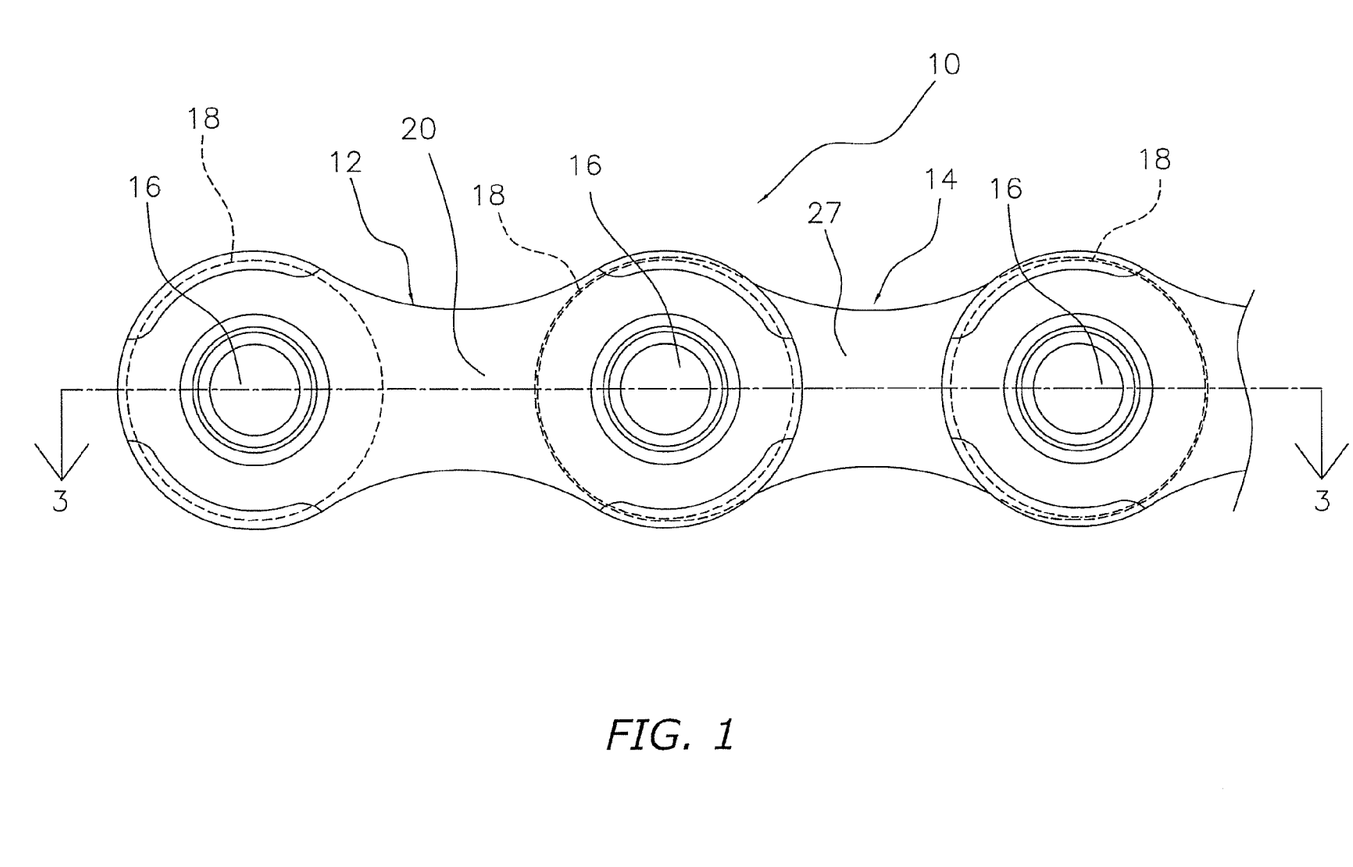
FIG. 1 is an enlarged side elevational view of a portion of a bicycle chain in accordance with a first illustrative embodiment.

Referring initially to FIG. 1, a portion of a bicycle chain 10 is illustrated in accordance with a first embodiment. As used herein to describe the parts of the bicycle chain 10, the following directional terms "inside", "outside", "inner", "outer", "above", "below", "width", and "longitudinal" as well as any other similar directional terms refer to those directions relative to the bicycle chain 10 in an installed position on a bicycle that is upright on a horizontal surface.

The bicycle chain 10 basically includes a plurality of outer link plates 12, a plurality of inner link plates 14 and a plurality of connecting pins or rivets 16 and a plurality of rollers 18. Each opposed pair of the outer link plates 12 connected together by a pair of connecting pins 16 forms an outer link. Each opposed pair of the inner link plates 14 connected together by a pair of connecting pins 16 forms an inner link. The inner link plates 14 are interconnected in an alternating manner with the outer link plates 12 by the connecting pins 16 in a conventional manner. Thus, the outer link plates 12 are arranged outside of the inner link plates 14 with respect to a center longitudinal plane of the bicycle chain 10.

The outer link plates 12, the inner link plates 14, the connecting pins 16 and the rollers 18 are metal parts that are well known in the bicycle chain field. The connecting pins 16 are illustrated as solid cylinders with a recess at each end so that the connecting pins 16 can be easily deformed at each end. Preferably, the connecting pins 16 are subjected to a surface hardening treatment to improve abrasion resistance. The rollers 18 are disposed on the connecting pins 16 to rotate on the connecting pins 16. The connecting pins 16 and the rollers 18 are well known structures, and thus, they will not be discussed and/or illustrated in detail herein, except as needed to explain the construction of the bicycle chain 10. Moreover, these parts can vary as needed and/or desired. For example, while the connecting pins 16 are illustrated as solid cylinders, the connecting pins 16 can be hollow pins if needed and/or desired.

A master chain link (not shown) preferably interconnects two pairs of the inner link plates 14 together so as to form a single continuous loop with alternating outer links and inner links. Thus, the master chain link has a pair of outer link plates. The inner link plates 14 are all preferably identical. Similarly, all of the outer link plates 12 are preferably identical, except for the link plates that form the master chain link. However, it is possible that the outer link plates 12 and/or the inner link plates 14 can include other features (not shown herein) such that not all of the outer link plates 12 are identical and/or such that not all of the inner link plates 14 are identical.

Figure 2:
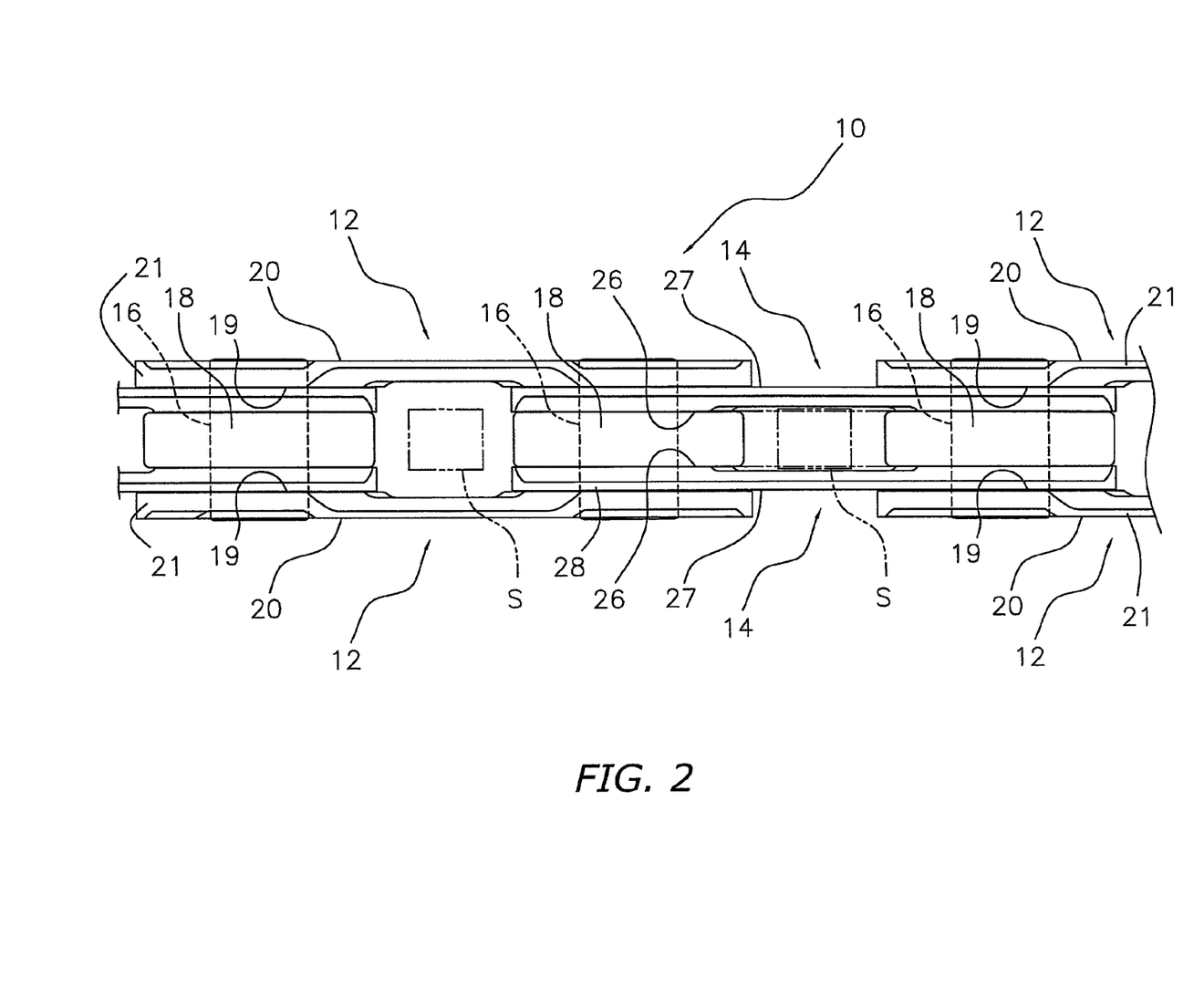
FIG. 2 is a top plan view of the portion of the bicycle chain illustrated in FIG. 1.
Figure 3:
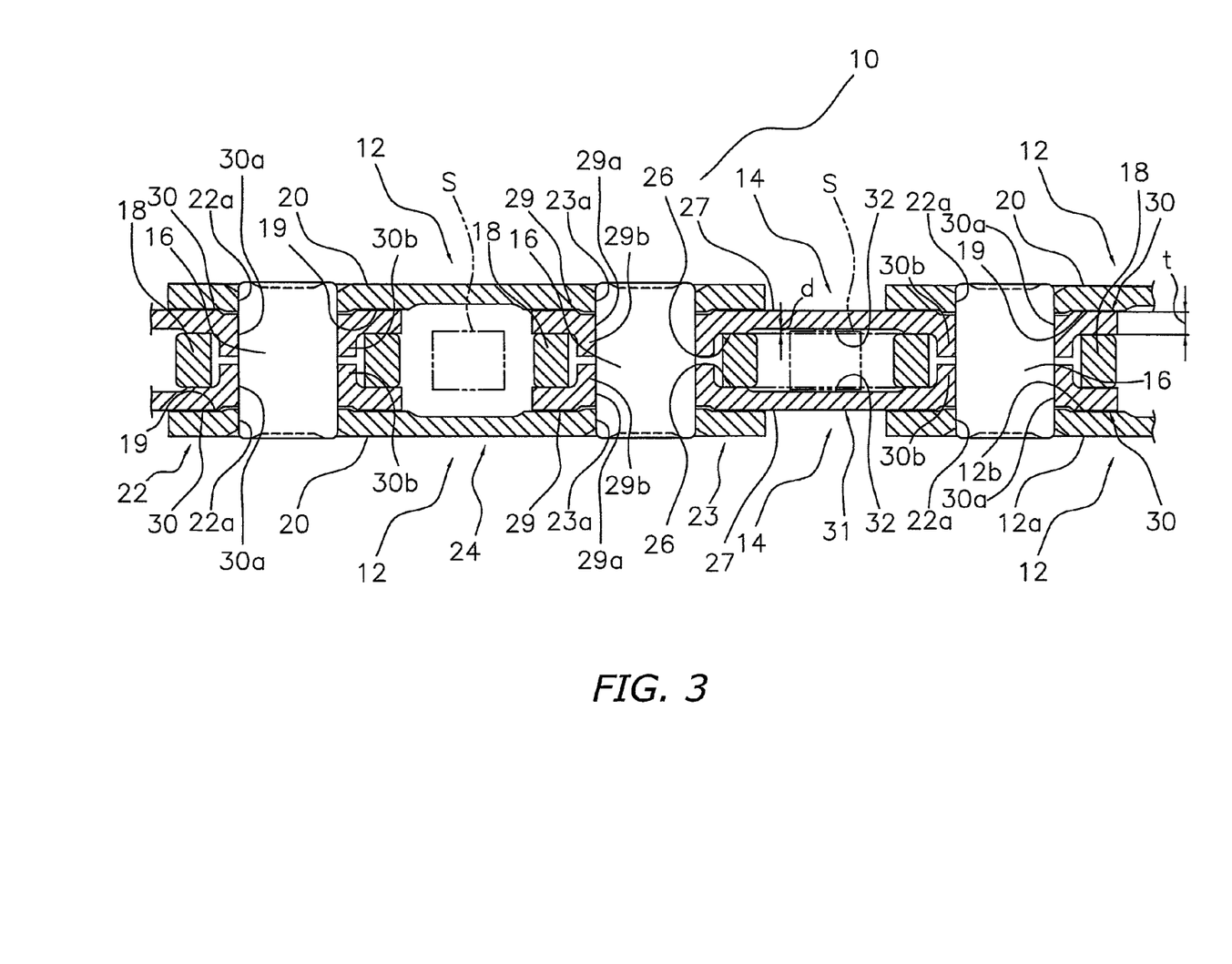
FIG. 3 is a longitudinal cross sectional view of the portion of the bicycle chain illustrated in FIG. 1 as seen along section line 3-3 of FIG. 1.
Figure 4:
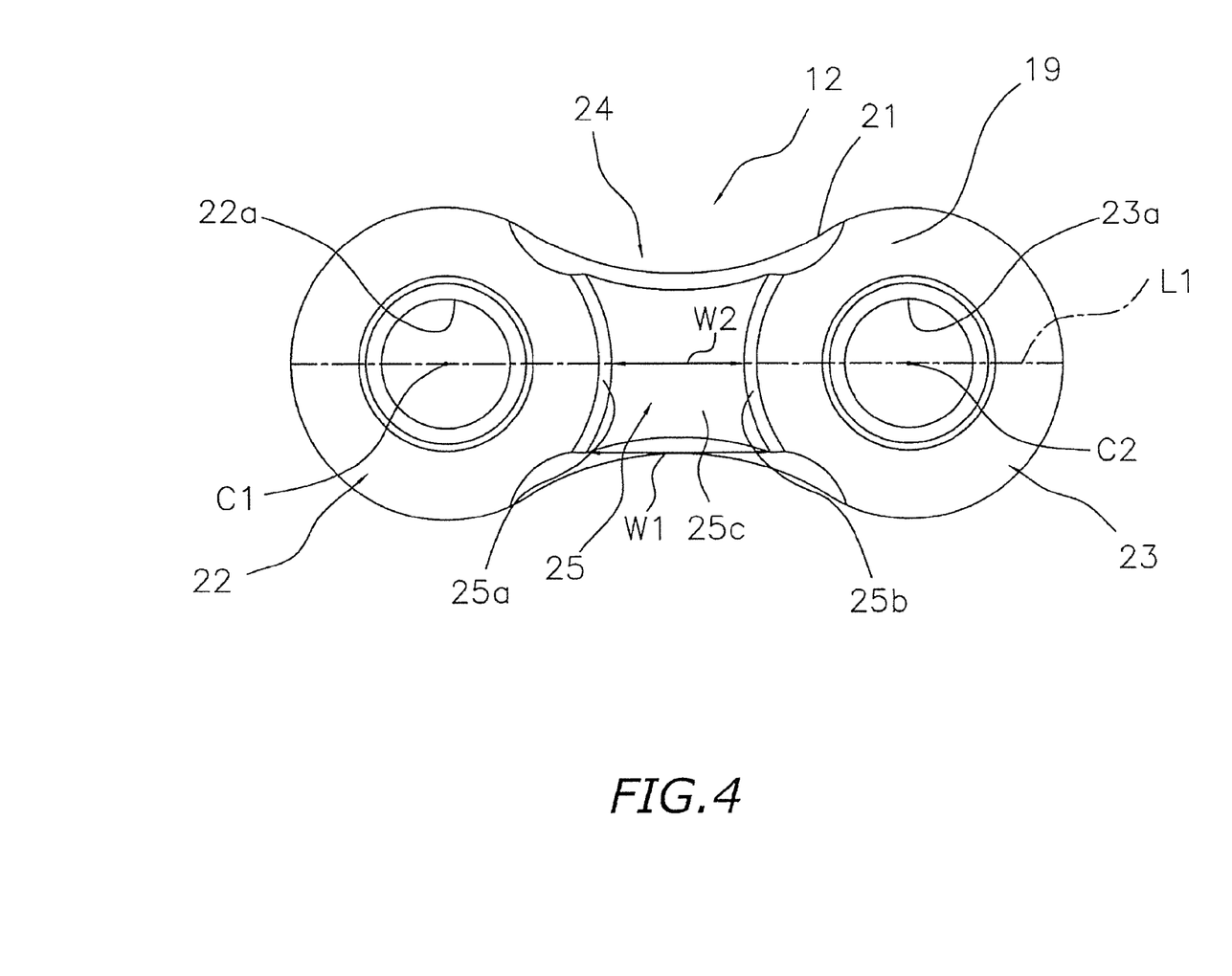
FIG. 4 is an inside elevational view of one of the outer link plates of the bicycle chain illustrated in FIGS. 1 to 3 showing the inner facing side surface.

Referring now to FIGS. 2 to 4, each of the outer link plates 12 has an inside surface 19 and an outside surface 20. The inside surfaces 19 of each of the outer link plates 12 face each other in each of the outer links. The outside surfaces 20 are opposite to the inside surfaces 19 and face in opposite directions in each of the outer links. The inside surfaces 19 of the outer inner link plates 12 define sprocket teeth receiving spaces that receive the teeth of the sprocket S of the sprockets (not shown) of a rear cassette (not shown). The outside surfaces 20 of the outer link plates 12 are preferably smooth and flat. Each of the outer link plates 12 has an outer peripheral edge 21 that is disposed between the inside and outside surfaces 19 and 20.

Each of the outer link plates 12 includes a first outer end portion 22, a second outer end portion 23 and an outer connecting portion 24. The outer connecting portion 24 extends between the first and second outer end portions 22 and 23. The portions 22 to 24 of each of the outer link plates 12 are preferably formed as a one-piece, unitary member from a hard, rigid material such as a metallic material that is known to be used for manufacturing bicycle chains. In the illustrated embodiment, the outer peripheral edge 21 is preferably chamfered or beveled at least along the outer connecting portion 24 on the inside surfaces 19 of each of the outer link plates 12 as seen in FIG. 4. Preferably, the chamfer of the outer peripheral edge 21 also extends along parts of the first and second outer end portions 22 and 23 as seen in FIG. 4.

The first outer end portion 22 has a first outer connecting opening 22a for receiving one end of one of the connecting pins 16. The first outer connecting opening 22a has a center C1 that defines a pivot axis of the outer link plate 12. The second outer end portion 23 has a second outer connecting opening 23a for receiving one end of one of the connecting pins 16. The second outer connecting opening 23a has a center C2 that defines a pivot axis of the outer link plate 12. The connecting pins 16 extend through the first and second outer connecting openings 22a and 23a. The diameters of the first and second outer connecting openings 22a and 23a are slightly smaller than the diameters of the connecting pins 16.

In this way, the connecting pins 16 are press-fit to the first and second outer connecting openings 22a and 23a of the outer link plate 12. Both ends of the connecting pins 16 project slightly from the first and second outer connecting openings 22a and 23a. Preferably, the outside surface 20 of the outer link plate 12 has a chamfer surrounding the first and second outer connecting openings 22a and 23a. The ends of the connecting pins 16 are plastically deformed for fixedly securing the outer link plates 12 on the connecting pins 16. When the ends of the connecting pin 16 are plastically deformed, the deformed material of the connecting pin 16 moves into the chamfer surrounding the first and second outer connecting openings 22a and 23a.

As seen in FIG. 4, each of the outer link plates 12 has a longitudinal centerline L1 that bisects the portions 22 to 24. The longitudinal centerline L1 is located at the center of the longitudinal direction in the chain 10. The longitudinal centerline L1 passes through the centers C1 and C2 of the first and second outer connecting openings 22a and 23a. Each of the outer connecting portions 24 of each of the outer link plates 12 includes a concave recess 25 disposed on the inside surface 19 of a corresponding one of the outer connecting portions 24. Each of the concave recesses 25 of the outer connecting portions 24 has a maximum longitudinal width W1 and a minimum longitudinal width W2 as measured in the longitudinal direction of the outer link plate 12. For each of the outer link plates 12, the maximum longitudinal width W1 of the concave recess 25 is disposed on the outer peripheral edge 21 along the outer connecting portion 24. On the other hand, for each of the outer link plates 12, the minimum longitudinal width W2 is disposed in a region adjacent longitudinal centerline L1. Each of the concave recesses 25 of the outer connecting portions 24 at least extends from the outer peripheral edge 21 to the longitudinal centerline L1. With the concave recesses 25 of the outer connecting portions 24, the inner widths of the areas between the opposed outer link plates 12 where the teeth of the sprocket S enter can be widened even if the width of the bicycle chain 10 is narrowed.

As seen in FIG. 4, the concave recess 25 is symmetrically shaped about the longitudinal centerline L1 of each of the outer link plates 12. Each of the concave recesses 25 of the outer connecting portions 24 is defined by a first arc shaped end edge 25a that is adjacent the first outer end portion 22 and a second arc shaped end edge 25b that is adjacent the second outer end portion 23. The first arc shaped end edge 25a of each of the outer link plates 12 has an arc center that coincides with the center C1 of the first outer connecting opening 22a. The second arc shaped end edge 25b of each of the outer link plates 12 has an arc center that coincides with the center C2 of the second outer connecting opening 23a. Alternatively, the first and second arc shaped end edges 25a and 25b may have arc centers that do not coincide with the centers C1 and C2.

The portions 22 to 24 of the outer link plate 12 generally have the same minimum thickness between the inside and outside surfaces 19 and 20, excluding a pair of chamfered outer edge portions 21a and 21b and the concave recess 25.

Referring back to FIG. 2, each of the inner link plates 14 has an inside surface 26 and an outside surface 27. The inside surfaces 26 of each of the inner links face each other. The outside surfaces 27 are opposite to the inside surfaces 26. The outside surfaces 27 of the inner link plates 14 are preferably smooth and flat. In this embodiment, the outside surfaces 27 of the inner link plates 14 are flat. Thus, the inner widths of the areas between the opposed inner link plates 14 where the teeth of the sprocket S enter can be widened while keeping the outer widths between the outside surfaces 27 of the opposed inner link plates 14 narrow.

Referring now to FIGS. 2, 3, 5 and 6, each of the inner link plates 14 has an inside surface 26 and an outside surface 27. The inside surfaces 26 of each of the inner links face each other in each of the inner links. The inside surface 26 of the inner link plates 14 includes first and second supporting areas 26a and 26b that support the rollers 18 as explained below. The outside surfaces 27 are opposite to the inside surfaces 26 and face in opposite directions in each of the inner links. The inside surfaces 19 and 26 of the outer and inner link plates 12 and 14, respectively, define sprocket teeth receiving spaces that receive the teeth of the sprocket S of the sprockets (not shown) of a rear cassette (not shown). The outside surfaces 27 of the inner link plates 14 are preferably smooth and flat. Each of the inner link plates 14 has an outer peripheral edge 28 that is disposed between the inside and outside surfaces 26 and 27.

Figure 5:
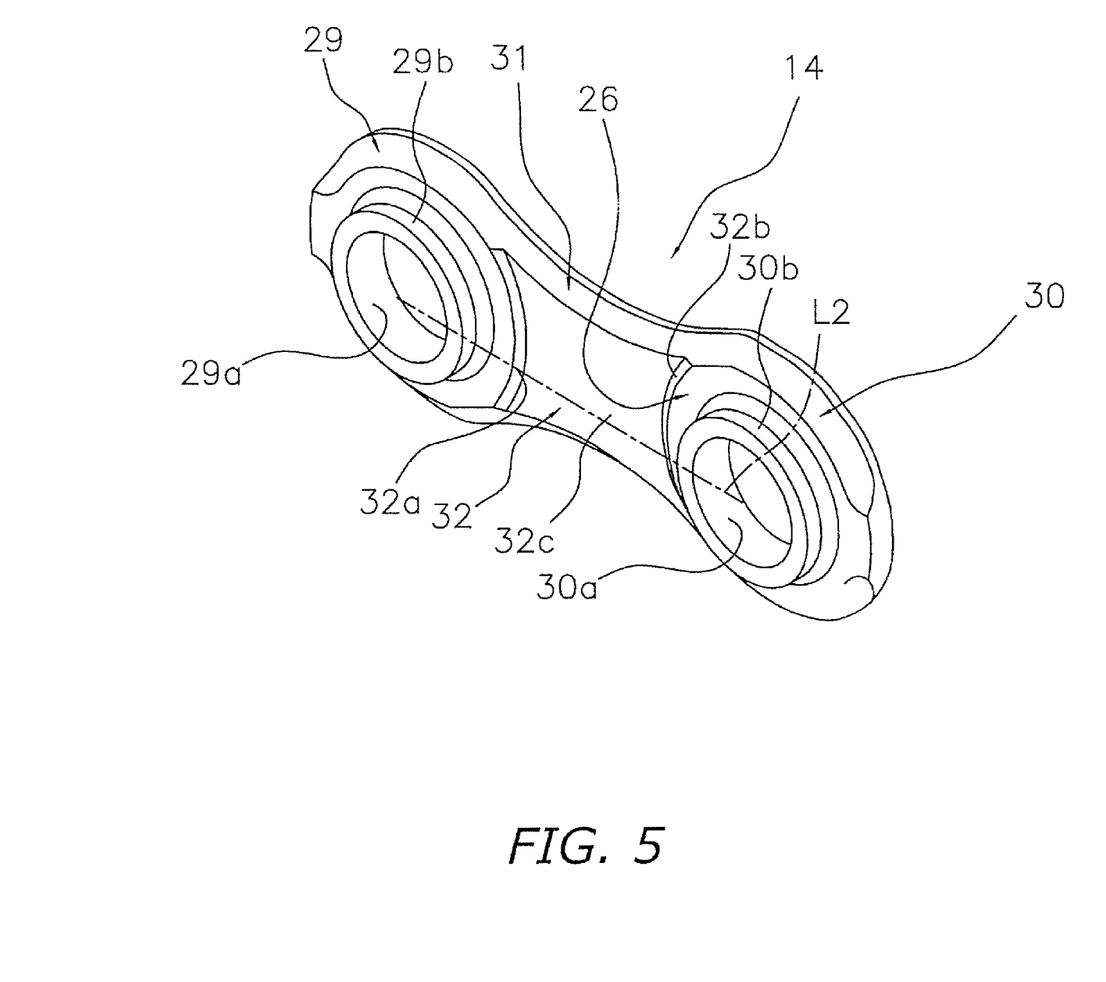
FIG. 5 is an inside perspective view of one of the inner link plates of the bicycle chain illustrated in FIGS. 1 to 3 showing the inner facing side surface.
Figure 6:
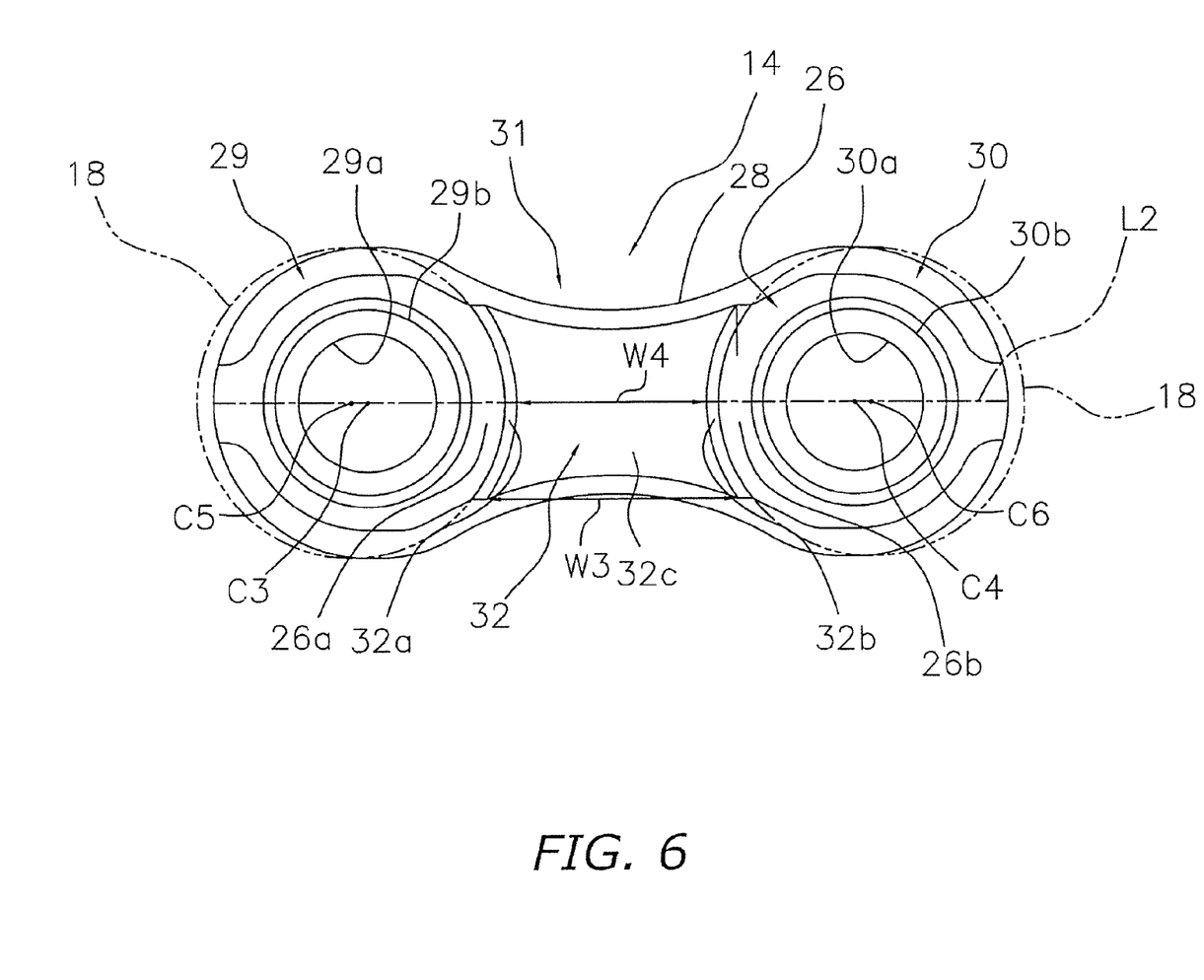
FIG. 6 is an inside elevational view of the inner link plate illustrated in FIG. 5 showing the inner facing side surface.

Each of the inner link plates 14 includes a first inner end portion 29, a second inner end portion 30 and an inner connecting portion 31. The inner connecting portion 31 extends between the first and second inner end portions 29 and 30. The portions 29 to 31 of each of the inner link plates 14 are preferably formed as a one-piece, unitary member from a hard, rigid material such as a metallic material that is known to be used for manufacturing bicycle chains. In the illustrated embodiment, the outer peripheral edge 28 is preferably chamfered or beveled at least along the inner connecting portion 31 on the inside surfaces 26 of each of the inner link plates 14 as seen in FIGS. 5 and 6. Preferably, the chamfer of the outer peripheral edge 28 also extends from the along a majority of the first and second inner end portions 29 and 30 as seen in FIGS. 5 and 6

The first inner end portion 29 has a first inner connecting opening 29a for receiving one end of one of the connecting pins 16. The first inner connecting opening 29a has a center C3. The second inner end portion 30 has a second inner connecting opening 30a for receiving one end of one of the connecting pins 16. The second inner connecting opening 30a has a center C4. The first and second supporting areas 26a and 26b are disposed around the first and second inner connecting openings 29a and 30a, respectively. The connecting pins 16 extend through the connecting openings 29a and 30a. The diameters of the first and second inner connecting openings 29a and 30a are slightly larger than the diameters of the connecting pins 16.

As seen in FIG. 6, each of the inner link plates 14 has a longitudinal centerline L2 that bisects the portions 29 to 31. The longitudinal centerline L2 is located at the center of the longitudinal direction in the chain 10. The longitudinal centerline L2 passes through the centers C3 and C4 of the first and second inner connecting openings 29a and 30a. Each of the inner connecting portions 31 of each of the inner link plates 14 includes a concave recess 32 disposed on the inside surface 26 of a corresponding one of the inner connecting portions 31. Each of the concave recesses 32 of the inner connecting portions 31 has a maximum longitudinal width W3 and a minimum longitudinal width W4 as measured in the longitudinal direction of the inner link plate 14. For each of the inner link plates 14, the maximum longitudinal width W3 of the concave recess 32 is disposed on the outer peripheral edge 28 along the inner connecting portion 31. On the other hand, for each of the inner link plates 14, the minimum longitudinal width W4 is disposed in a region adjacent longitudinal centerline L2. Each of the concave recesses 32 of the inner connecting portions 31 at least extends from the outer peripheral edge 28 to the longitudinal centerline L2.

As seen in FIG. 6, the concave recess 32 is symmetrically shaped about the longitudinal centerline L2 of each of the inner link plates 14. Thus, the concave recess 32 is formed on both sides of the longitudinal centerline L2. Therefore, the bicycle chain 10 can be assembled without concern about the orientation of the inner link plates 14. Each of the concave recesses 32 of the inner connecting portions 31 is defined by a first arc shaped end edge 32a that is adjacent the first inner end portion 29 and a second arc shaped end edge 32b that is adjacent the second inner end portion 30. The first arc shaped end edge 32a of each of the inner link plates 14 has an arc center C5. The second arc shaped end edge 32b of each of the inner link plates 14 has an arc center C6. The centers C5 and C6 of the first and second arc shaped end edges 32a and 32b are located further from the concave recesses 32 in a longitudinal direction of the inner link plate 14 than the centers C3 and C4 of the inner connecting openings 29a and 30a, respectively. Since the first and second arc shaped end edge 32a and 32b have an arc-shape, the first and second supporting areas 26a and 26b can be efficiently formed such that the first and second supporting areas 26a and 26b have curvatures corresponding to the roller 18. Also by configuring the first and second arc shaped end edges 32a and 32b so that the centers C5 and C6 are located further from the concave recesses 32 in a longitudinal direction of the inner link plate 14 than the centers C3 and C4 of the inner connecting openings 29a and 30a, it becomes possible to maintain a state in which the curvatures of the first and second arc shaped end edges 32a and 32b overlap with the roller 18 even if the rollers 18 are displaced outward in a longitudinal direction of the inner link plate 14 when the chain 10 is driven as shown by a double-dashed line in FIG. 6. As a result, the first supporting area 26a of the inside surface 26 on the first inner end portion 29 and the second supporting area 26b of the inside surface 26 on the second inner end portion 30 can be prevented from being exposed as the chain 10 is driven by a sprocket. In other words, it becomes possible to prevent the sprocket tooth S from entering the first and second supporting areas 26a and 26b of the inside surface 26 when shifting between sprockets during a speed changing operation. Thus, a smoother speed changing operation is possible with this arrangement. Furthermore, the first and second supporting areas 26a and 26b that support the rollers 18 such that shaking of the rollers 18 can be suppressed to a minimum amount.

As seen in FIG. 3, each of the inner link plates 14 has an overall plate thickness t and a depth d of the concave recess 32. The thickness t of the inner link plate 14 is thinner than an overall plate thickness of the outer link plate 12. For example, the thickness t of the inner link plate 14 is preferably in a range from 0.8 millimeter to 0.9 millimeter in this illustrated embodiment as shown in FIG. 3. Also for example, the depth d of the concave recess 32 is preferably in a range from 0.1 millimeter to 0.2 millimeter in this illustrated embodiment as shown in FIG. 3. Also, first and second arc shaped end edges 32a and 32b are preferably inclines from about twenty degrees to about twenty-five degrees from the first and second inner end portions 29 and 30 to a bottom surface 32c of the concave recess 32 as shown in FIG. 5.

Each of the inner link plates 14 includes a first cylindrical boss part 29b formed on the inside surface 26 of the first inner end portion 29 and a second cylindrical boss part 30b formed on the inside surface 26 of the second inner end portion 30. The first and second cylindrical boss parts 29b and 30b project axially from the inside surface 26 of the inner link plate 14. The first and second cylindrical boss parts 29b and 30b surround of the first and second inner connecting openings 29a and 30a, respectively, to extend the first and second inner connecting openings 29a and 30a. As shown in FIG. 3, the first and second cylindrical boss parts 29b and 30b have a dimension such that a small gap is formed between opposed pairs of the first and second cylindrical boss parts 29b and 30b after the chain 10 is fully assembled. The rollers 18 are rotatably arranged on the outer sides of the first and second cylindrical boss parts 29b and 30b. Thus, the rollers 18 are supported on the first and second cylindrical boss parts 29b and 30b to rotate freely.

In the bicycle chain 10 as described above, the concave recess 32 are formed in the inner link plate 14 at the areas where the sprocket S enters between a pair of opposed inner link plates 14. As a result, the widths of the areas between the opposed inner link plates 14 where the sprocket S enters are widened even if the width of the bicycle chain 10 is narrowed.

Moreover, in the bicycle chain 10 as described above, because the concave recess 32 is symmetrically shaped about the longitudinal centerline L2, the widths of the areas between the opposed inner link plates 14 where the sprocket S enters can be widen without concern about how the bicycle chain 10 is installed (i.e., the chain 10 is not an asymmetrical chain that should be installed in a prescribed orientation with respect to the driving direction of the chain 10).

In addition with the bicycle chain 10 as described above, preferably, the first and second arc shaped end edges 32a and 32b have their arc centers C5 and C6 located further from the concave recess 32 in the longitudinal direction of the inner link plate 14 than the centers C3 and C4 of the first and second connecting openings 29a and 30a. Therefore, with this arrangement, it becomes possible to maintain a state in which the curvatures the first and second arc shaped end edges 32a and 32b overlap with the roller 18 even if the rollers 18 are displaced outward in a longitudinal direction of the inner link plate 14 when the chain 10 is driven. As a result, the first area 26a of the inside surface 26 on the first inner end portion 29 and the second area 26b of the inside surface 26 on the second inner end portion 30 can be prevented from being exposed as the chain 10 is driven by a sprocket. In other words, it becomes possible to prevent the sprocket tooth S from entering the first and second areas 26a and 26b of the inside surface 26 when shifting between sprockets during a speed changing operation. Thus, a smoother speed changing operation is possible with this arrangement.

Figure 7:
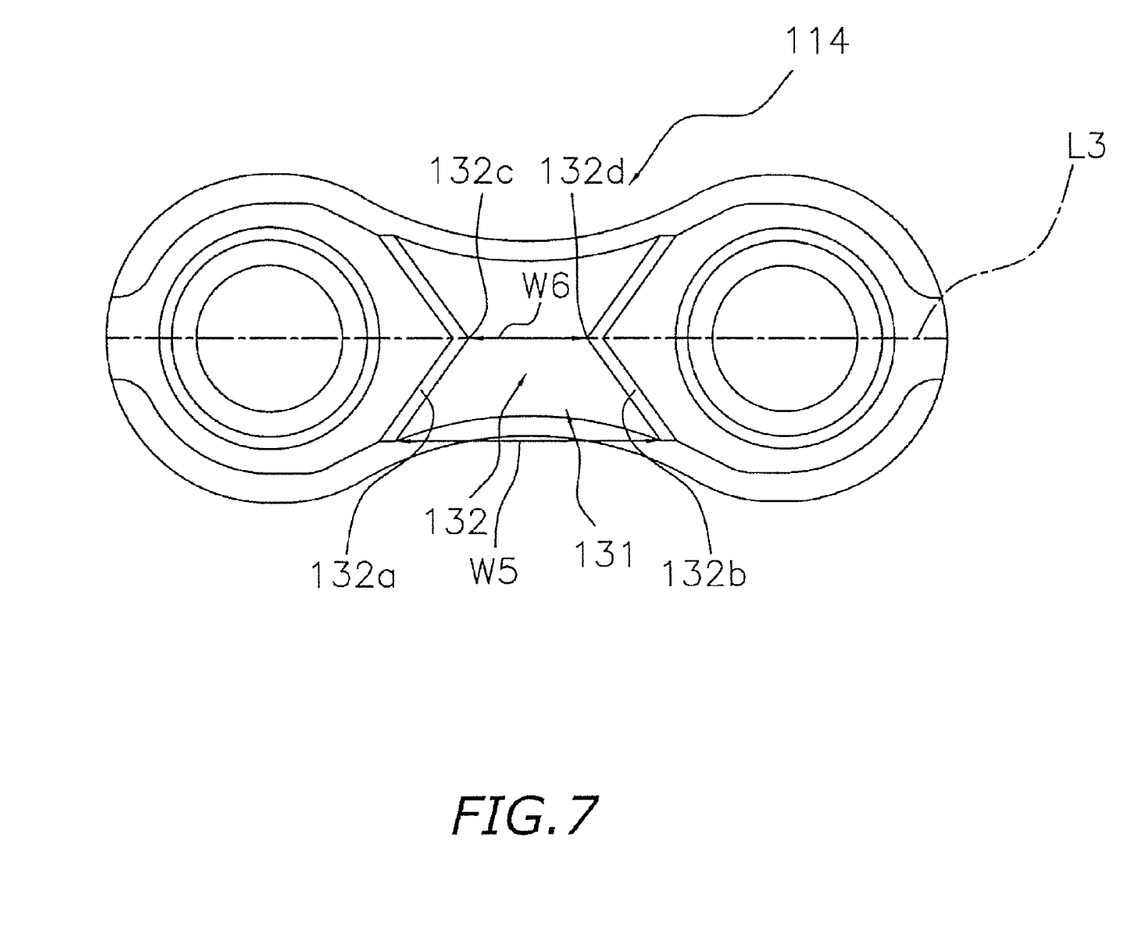
FIG. 7 is an inside elevational view, similar to FIG. 6, of an inner link plate in accordance with a second illustrative embodiment.

Referring now to FIG. 7, an inner link plate 114 in accordance with a second embodiment will now be explained. The inner link plates 14 are replaced with the inner link plates 114 to form a bicycle chain in accordance with the second embodiment. In other words, the inner link plates 114 are used with the outer link plates 12, the connecting pins 16 and the rollers 18 to form a bicycle chain in accordance with the second embodiment. The inner link plate 114 is identical to the inner link plate 14, except that the inner link plate 114 has a connected part 131 that includes a concave recess 132 that is shaped differently from the concave recess 32 of the inner link plate 14. In view of the similarity between the first and second embodiments, the descriptions of the parts of the second embodiment that are identical to the parts of the first embodiment may be omitted for the sake of brevity.

As seen in FIG. 7, the inner link plate 114 is a one-piece, unitary member that is made of a suitable hard rigid material that is typically used for bicycle chains such as an alloy steel, a chrome-plated steel or a stainless steel. The peripheral edge of the inner link plate 114 has a chamfer or bevel formed along the inside surface of the inner link plate 114 in the same manner as in the case of the inner link plate 14. Also the dimensions of the inner link plate 114 are the same as the inner link plate 14 as discussed above.

The concave recess 132 is formed in the inside surface of the connected part 131 of the inner link plate 114 and extends between the chamfer parts of the outer peripheral edge in a direction perpendicular to a longitudinal centerline L3 of the inner link plate 114 that passes through the centers of the first and second inner connecting openings. The depth of the recess 132 is preferably the same as the depth of the recess 32 discussed as above. Here, the recess 132 is symmetrically arranged with respect to the longitudinal centerline L1 The recess 132 is defined in a longitudinal direction of the inner link plate 114 by a first end edge 132a and a second end edge 132b. The first end edge 132a is a generally convex surface that forms a first vertex 132c. Similarly, the second end edge 132b is a generally convex surface that forms a second vertex 132d. Preferably, the first and second vertexes 132c and 132d lie on the longitudinal centerline L3 of the inner link plate 114. As a result, the recess 132 has a maximum longitudinal width W5 disposed adjacent or on the peripheral edge of the inner link plate 114 and a minimum longitudinal width W6 disposed adjacent or on the longitudinal centerline L3 of the inner link plate 114.

Figure 8:
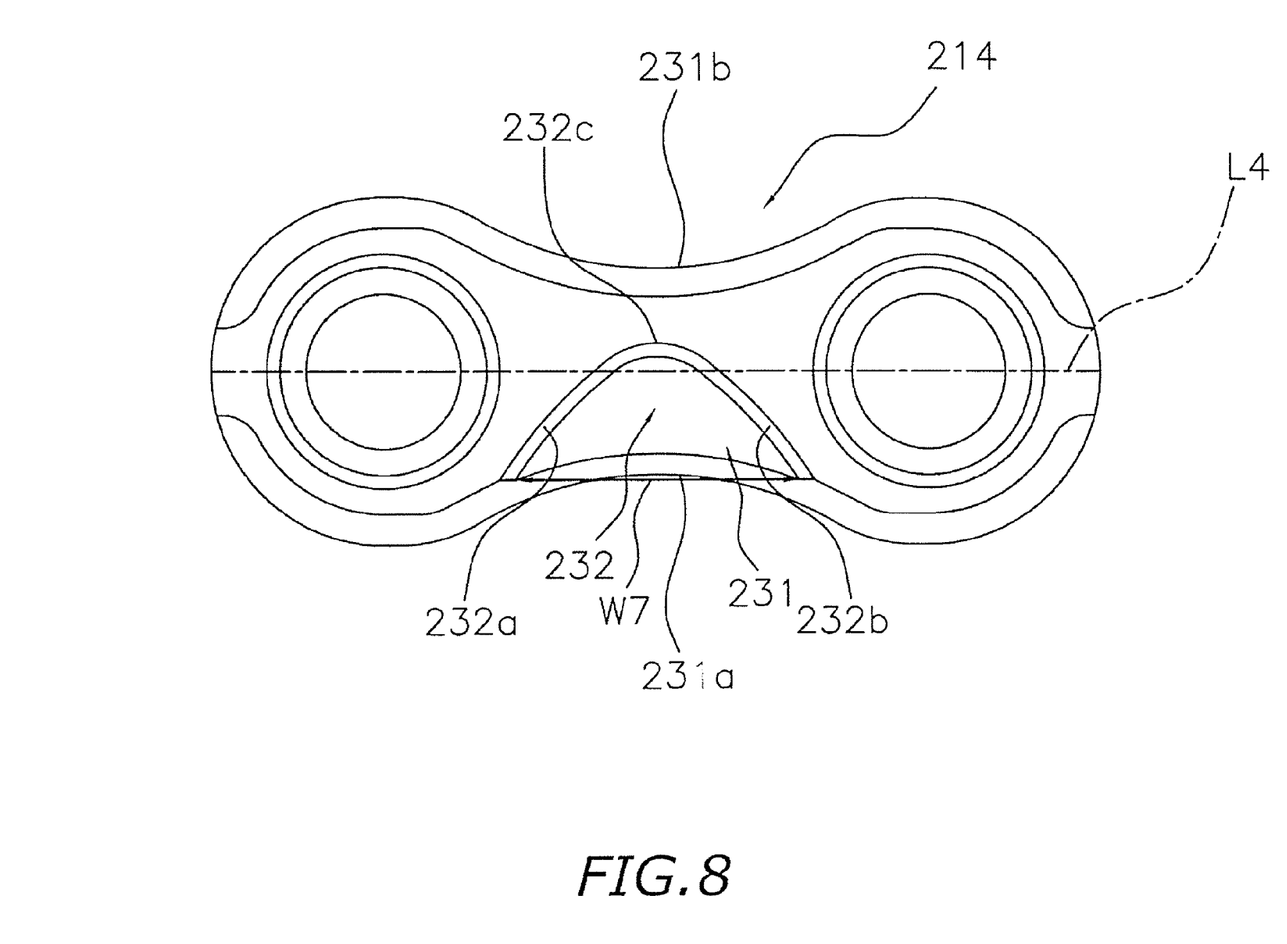
FIG. 8 is an inside elevational view, similar to FIG. 6, of an inner link plate in accordance with a third illustrative embodiment.

Referring now to FIG. 8, an inner link plate 214 in accordance with a third embodiment will now be explained. The inner link plates 14 are replaced with the inner link plates 214 to form a bicycle chain in accordance with the third embodiment. In other words, the inner link plates 214 are used with the outer link plates 12, the connecting pins 16 and the rollers 18 to form a bicycle chain in accordance with the third embodiment. The inner link plate 214 is identical to the inner link plate 14, except that the inner link plate 214 has a connected part 231 that includes a concave recess 232 that is shaped differently from the concave recess 32 of the inner link plate 14. In view of the similarity between the third embodiment and the prior embodiments, the descriptions of the parts of the third embodiment that are identical to the parts of the prior embodiments may be omitted for the sake of brevity.

As seen in FIG. 8, the inner link plate 214 is a one-piece, unitary member that is made of a suitable hard rigid material that is typically used for bicycle chains such as an alloy steel, a chrome-plated steel or a stainless steel. The peripheral edge of the inner link plate 214 has a chamfer or bevel formed along the inside surface of the inner link plate 214 in the same manner as in the case of the inner link plate 14. Also the dimensions of the inner link plate 214 are the same as the inner link plate 14 as discussed above.

The recess 232 is formed in the inside surface of the connected part 231 of the inner link plate 214. The depth of the recess 232 is preferably the same as the depth of the recess 32 discussed as above. Here, the recess 232 is not symmetrically arranged with respect to a longitudinal centerline L4 of the inner link plate 214 that passes through the centers of the first and second inner connecting openings. The recess 232 is defined by a first peripheral edge part 231a of the outer peripheral edge of the inner link plate 214, a first end edge 232a and a second end edge 232b. The first end edge 232a meets with the second end edge 232b at a vertex 232c. Preferably, the vertex 232c lies closer to a second peripheral edge part 231b of the outer peripheral edge of the inner link plate 214 than to the first peripheral edge part 231a of the outer peripheral edge of the inner link plate 214. As a result, the recess 232 has a maximum longitudinal width W7 disposed adjacent or on the first peripheral edge part 231a of the outer peripheral edge of the inner link plate 214, and at least extend to the longitudinal centerline L4. While the first and second end edges 232a and 232b are curved edges, the first and second end edges 232a and 232b are not limited to curved edges. For example, the first and second end edges 232a and 232b can be straight if needed and/or desired.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as the intended purpose remains. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An inner link plate for a bicycle chain, the inner link plate having a longitudinal centerline, an inside surface arranged to face another inner link plate when the bicycle chain is assembled, an outside surface opposite to the inside surface, and an outer peripheral edge disposed between the inside and outside surfaces, the inner link plate comprising:
a first end portion with a first connecting opening;
a second end portion with a second connecting opening; and
a connecting portion interconnecting the first and second end portions, the connecting portion including a recess disposed on the inside surface of the connecting portion, the recess having a maximum longitudinal width on the outer peripheral edge, and a minimum longitudinal width in a region adjacent the longitudinal centerline, the recess at least extending from the outer peripheral edge to the longitudinal centerline of the inner link plate, and a depth of the recess at the longitudinal centerline being at least as deep as a depth adjacent the outer peripheral edge.

2. The inner link plate according to claim 1, wherein the outside surface of the inner link plate is flat.

3. The inner link plate according to claim 1, wherein the recess is defined by a first arc shaped end edge that is adjacent the first end portion and a second arc shaped end edge that is adjacent the second end portion.

4. The inner link plate according to claim 1, wherein the recess is symmetrically shaped about the longitudinal centerline.

5. The inner link plate according to claim 4, wherein the outside surface of the inner link plate is flat.

6. An inner link plate for a bicycle chain, the inner link plate having a longitudinal centerline, an inside surface arranged to face another inner link plate when the bicycle chain is assembled, an outside surface opposite to the inside surface, and an outer peripheral edge disposed between the inside and outside surfaces, the inner link plate comprising:
a first end portion with a first connecting opening;
a second end portion with a second connecting opening; and
a connecting portion interconnecting the first and second end portions, the connecting portion including a recess disposed on the inside surface of the connecting portion, the recess having a maximum longitudinal width on the outer peripheral edge, and a minimum longitudinal width in a region adjacent the longitudinal centerline, the recess at least extending from the outer peripheral edge to the longitudinal centerline of the inner link plate, wherein
the recess is defined by a first arc shaped end edge that is adjacent the first end portion and a second arc shaped end edge that is adjacent the second end portion, and wherein
each of the first and second arc shaped end edges has an arc center located further from the recess in a longitudinal direction of the inner link plate than the centers of the first and second connecting openings.

7. The inner link plate according to claim 6, wherein the recess is symmetrically shaped about the longitudinal centerline.

8. The inner link plate according to claim 7, wherein the outside surface of the inner link plate is flat.

9. A bicycle chain comprising:
a pair of outer link plates that each includes a pair of outer end portions, and an outer connecting portion extending between the outer end portions, each of the outer end portions having an outer connecting opening;
a pair of inner link plates including a pair of inner end portions and an inner connecting portion extending between the inner end portions, each of the inner end portions having an inner connecting opening; and
a connecting pin disposed in one of the outer connecting openings of each of the outer link plates and in one of the inner connecting openings of each of the inner link plates;
each of the inner connecting portions having a longitudinal centerline, an inside surface arranged to face the other inner link plate when the bicycle chain is assembled, an outside surface opposite to the inside surface, and an outer peripheral edge disposed between the inside and outside surfaces,
each of the inner connecting portions including a recess disposed on the inside surface of a corresponding one of the inner connecting portions, each of the recesses having a maximum longitudinal width on a corresponding one of the outer peripheral edges, and a minimum longitudinal width in a region adjacent the longitudinal centerlines, respectively, each of the recesses at least extending from the outer peripheral edge to the longitudinal centerline, and a depth of the recess at the longitudinal centerline being at least as deep as a depth adjacent the outer peripheral edge.

10. The bicycle chain according to claim 9, wherein the outside surfaces of the inner link plates are flat.

11. The bicycle chain according to claim 9, wherein each of the recesses of the inner connecting portions are defined by a first arc shaped end edge that is adjacent one of the inner end portions and a second arc shaped end edge that is adjacent the other of the inner end portions.

12. The bicycle chain according to claim 9, wherein the recesses are symmetrically shaped about the longitudinal centerlines of a corresponding one of the inner link plates.

13. The bicycle chain according to claim 12, wherein the outside surfaces of the inner link plates are flat.

14. The bicycle chain according to claim 9, wherein each of the outer connecting portions has a longitudinal centerline, an inside surface arranged to face the other outer link plate when the bicycle chain is assembled, an outside surface opposite to the inside surface, and an outer peripheral edge disposed between the inside and outside surfaces of the outer link plates, and each of the outer connecting portions includes a recess disposed on the inside surface of a corresponding one of the outer connecting portions, the recesses of the outer connecting portions each having a maximum longitudinal width on a corresponding one of the outer peripheral edges of the outer connecting portions, and a minimum longitudinal width in a region adjacent longitudinal centerlines, respectively, each of the recesses at least extending from the outer peripheral edge to the longitudinal centerline.

15. A bicycle chain comprising:

a pair of outer link plates that each includes a pair of outer end portions, and an outer connecting portion extending between the outer end portions, each of the outer end portions having an outer connecting opening;

a pair of inner link plate including a pair of inner end portions and an inner connecting portion extending between the inner end portions, each of the inner end portions having an inner connecting opening; and a connecting pin disposed in one of the outer connecting openings of each of the outer link plates and in one of the inner connecting openings of each of the inner link plates;

each of the inner connecting portions having a longitudinal centerline, an inside surface arranged to face the other inner link plate when the bicycle chain is assembled, an outside surface opposite to the inside surface, and an outer peripheral edge disposed between the inside and outside surfaces, each of the inner connecting portions including a recess disposed on the inside surface of a corresponding one of the inner connecting portions, each of the recesses having a maximum longitudinal width on a corresponding one of the outer peripheral edges, and a minimum longitudinal width in a region adjacent the longitudinal centerlines, respectively, each of the recesses at least extending from the outer peripheral edge to the longitudinal centerline, wherein each of the recesses of the inner connecting portions are defined by a first arc shaped end edge that is adjacent one of the inner end portions and a second arc shaped end edge that is adjacent the other of the inner end portions, and wherein each of the first and second arc shaped end edges of each of the inner link plates has an arc center located further from the recesses in a longitudinal direction of each of the inner link plates than the centers of the inner connecting openings, respectively.

16. The bicycle chain according to claim 15, wherein the recesses are symmetrically shaped about the longitudinal centerlines of a corresponding one of the inner link plates.

17. The bicycle chain according to claim 16, wherein the outside surfaces of the inner link plates are flat.

* * * * *